United States Patent Office 2,779,153
Patented Jan. 29, 1957

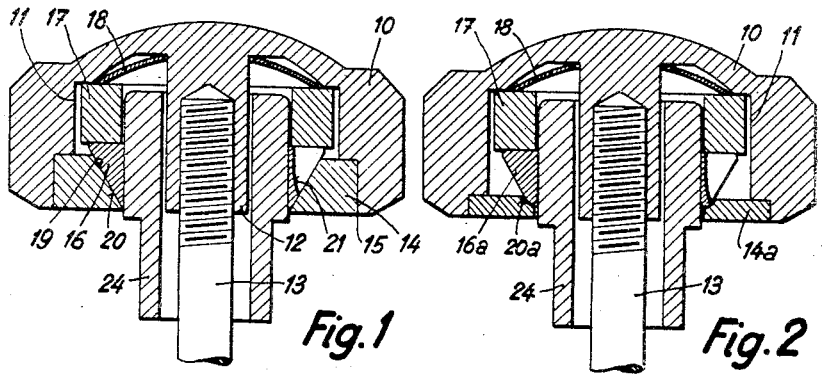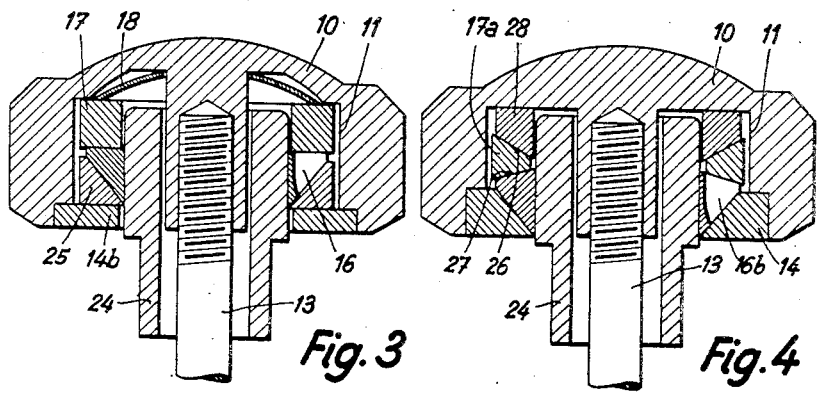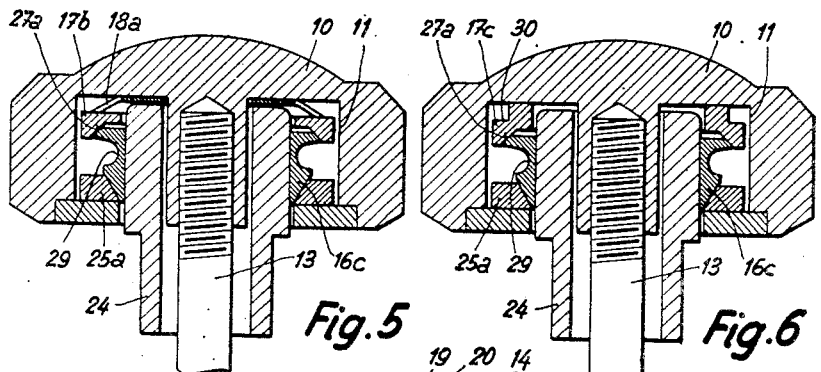

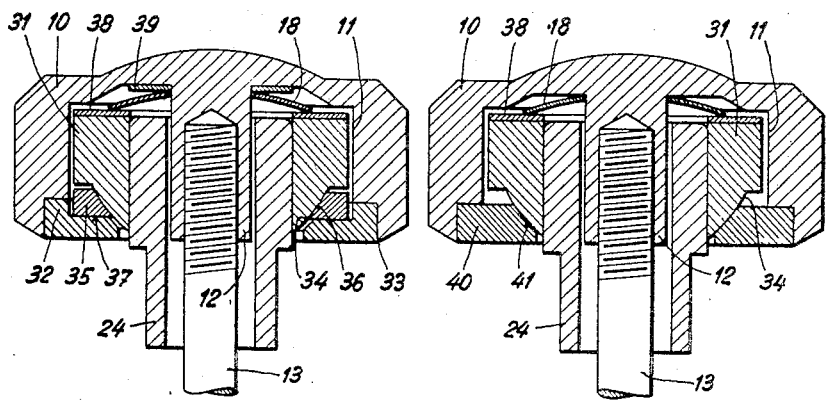
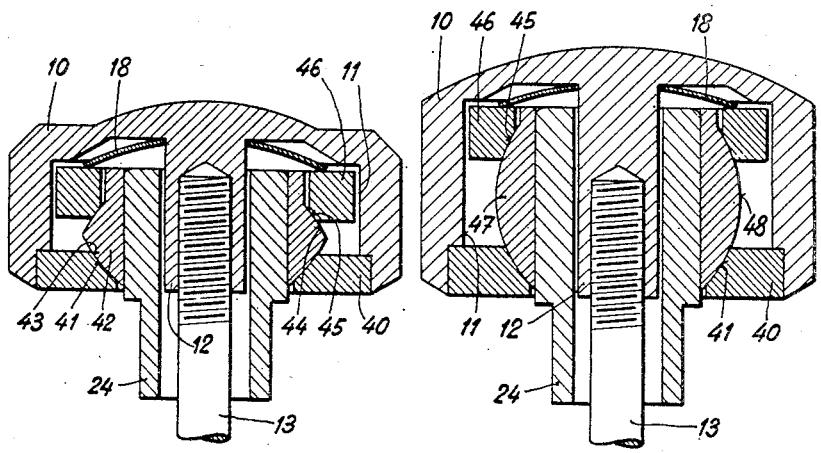

2,779,153

CROWN FOR WATERPROOF WATCHES

René Soguel, Les Hauts-Geneveys, Switzerland

Application July 10, 1952, Serial No. 298,131

Claims priority, application Switzerland July 13, 1951

26 Claims. (Cl. 58—90)

This invention relates to watchmaking, and more particularly to crowns for winding waterproof watches and the like.

Crowns for waterproof watches always comprise a tightening member interposed between a part movable with the crown and a stationary part of the case. This tightening member may be provided in the form of a ring, or a sleeve, and may be made of resilient synthetic material, or of metal.

In crowns heretofore disclosed, the watertightness is assured by contact of a portion of said tightening member with a cylindrical part of the crown or the case. When the watch is wound or set, one of the two portions whose mutual contact is responsible for the watertight joint, turns with respect to the other. This results in wear of one or the other portion if not of both. The prior art is replete with all sorts of contrivances intended for taking up this wear which, however, were invariably more or less complicated.

The desire to extend the life of these prior art devices, moreover, necessitated a reduction of machining tolerances which materially increased the manufacturing cost of the crowns.

It is an object of the present invention to provide a waterproof crown the wear in which is taken up readily and the watertightness of which remains secure over long periods, without any necessity for reducing the machining tolerances of the various elements below the limits customary with ordinary crowns.

Other objects, and the manner in which the same are attained, will become apparent as this specification proceeds.

The present invention contemplates a crown for waterproof watches wherein all friction on the cylindrical surfaces of the portions forming the tight joint, is carefully avoided.

The improved crown according to this invention comprises, as do ordinary crowns, a cavity and on the bottom thereof, a screw threaded pipe integral with the crown. A sealing ring disposed in the interior of this cavity is designed to encompass the tubular extension on the watch case so as to remain stationary with said tubular extension during winding and setting of the watch, this sealing ring having substantially the form of a body of revolution the axis of which coincides substantially with the axis of said tubular extension; the meridian of the section generating this body of rotation has a part whose tangent in every point cuts the axis of said body of revolution, the surface portion of the sealing ring generated by said part of the meridian being designed to come in contact, under the influence of a spring member provided in the interior of said cavity and acting axially upon said sealing ring, with a tightening ring having a surface portion corresponding to said surface portion on the sealing ring, the two rings coming in contact at said surface portions at least in one point of any section thereof whatever is the position of the crown relative to the tubular extension so as to assure the watertightness of the crown, said surface portions having a shape such that their aforenoted state of mutual contact is preserved even if the direction of the axis of one of said rings varies slightly with rotary displacements of the crown relative to said tubular extension.

In order that this sealing ring might encompass the tubular extension, it is machined in a manner such as to grip the tubular extension with snug fit. This grip may even be adapted to be tightened by at least one countersunk radial groove or by a peripheral recess in the rounded profile.

In the drawing affixed to this specification and forming part thereof, several embodiments of the invention are illustrated diagrammatically by way of example.

In the drawing,

Figs. 1 to 6, and 8 to 11 show longitudinal sections of as many individual embodiments of the invention, while Fig. 7 represents a detail, drawn to a larger scale, of Fig. 1.

Referring now to the drawing wherein like elements are denoted by identical reference numerals, and first to Fig. 1, the crown 10 has a cavity 11 and on the bottom thereof, a screw threaded pipe 12 integral with the crown, said pipe being screwed on the winding stem 13. A fixing disc 14 set in a recess 15 of the crown 10 retains, in the interior of the cavity 11, a sealing ring 16 and a closing ring 17. The closing ring 17 has cylindrical crown shape and is forced against the sealing ring 16 by means of a thin curved disc or plate 18 which abuts against the bottom of the cavity 11 and acts as spring. The sealing ring 16 which has the configuration of a body of rotation, has a conical surface 19 which abuts against an analogous surface 20 provided on the fixing disc 14 which serves as tightening member. The ring 16 has countersunk radial grooves or slots to render it resilient so it will tightly encompass the tubular extension 24; one such countersunk radial groove 21 is shown, in section, in Fig. 1. These grooves or slots should be very narrow; if more than one of these grooves is present, they may be distributed more or less regularly over the circumference of the ring. The contact made by the sealing ring 16 with the tightening ring 14 is illustrated in detail in Fig. 7 which shows that the opening angle of the conical surface of the ring 16 is slightly smaller than that of the conical surface of the ring 14. Besides, the cone of the ring 16 is truncated at 22. Accordingly, the two rings touch one another along the edge 23; the lower portion of the countersunk groove 21 is rounded in a manner such that the edge 23 is nearer to the axis of the ring than the end of the groove.

To come back to Fig. 1, the force exerted by the closing ring 17 on the sealing ring 16 causes the latter to slide with its edge 23, on the conical surface 20 of the tightening ring 14. This sliding displacement causes a tightening of the ring 16, made possible by the slots 21. In this manner, the ring 16 tightly grips the tubular extension 24 of the watch case.

During winding of the watch, the ring 16 remains stationary on the tubular extension, and friction occurs along the edge 23, on the one hand, and on the other hand either between ring 16 and ring 17, or between ring 17 and the curved disc 18, or between the curved disc 18 and the bottom of the cavity 11; none of these elements make contact with one another by way of cylindrical surface portions. Under no circumstances does friction occur on the circumference of the tubular extension 24 or on the lateral surface portions in the interior of the crown.

The opening angles of the two conical surfaces on the ring 16 and the annular disc or ring 14 are provided slightly different for the purpose of compensating for the inevitable inaccuracies in the machining of the various elements. In particular, when the winding stem is not properly axially aligned with the tubular extension 24, this may be compensated for. From the first winding operation on the edge 23 is subject to wear, and contact between the ring 16 and the disc or ring 14 will occur by little and little along surfaces which have adapted themselves to one another by frequent use. The force of the curved disc-shaped spring 18 compensates for the wear on rings 14 and 16 so that the watertightness remains assured for a long time.

In a second embodiment of the invention shown in Fig. 2, the contact between the sealing ring 16a and the fixing ring 14a which serves as the tightening member to assure watertightness, no longer occurs by way of two conical surfaces, but by way of curved surfaces, of rounded profile. The surfaces 20a of the tightening ring is rounded in a manner such that the spring pressure with which the curved disc 18 acts, through the closing ring 17, on the ring 16a, tends to tighten the grip of the ring 16a on the tubular extension 24. The various elements of this embodiment of the invention function in precisely the same manner as the elements of the first embodiment described above with reference to Figs. 1 and 7.

In the third embodiment of the invention shown in Fig. 3, a special tightening ring 25 is provided between the sealing ring 16 and the fixing ring 14b. The only difference between the first and this embodiment of the invention consists in that the conical surface provided on the fixing ring 14 of the former, is provided on the free tightening ring 25 of the latter embodiment. The principle of operation remains unchanged. The two conical surfaces have the same structural characteristics as those illustrated in Fig. 7 and described with reference to the first embodiment of the invention. The friction occurs between the edge 23 on the ring 16, and the conical surface on the tightening ring 25. By continuous use these surfaces adapt themselves to one another as described above.

In the fourth embodiment of the invention, shown in Fig. 4, the axial pressure supplied in the first three embodiments, by the curved disc 18, is now supplied by a closing ring 17a which is split and has two conical surfaces 26 and 27. The surface 26 is in contact with a corresponding surface provided on a supporting ring 28; the surface 27 is in contact with a corresponding surface provided on a sealing ring 16b. The contact between the ring 16b and the annular member or tightening ring 14 corresponds to that described with reference to Figs. 1 and 7. The opening angles of the various conical surfaces are selected in a manner such that the axial pressure exerted inside the crown by the ring 17a tends to tighten the grip of the ring 16b on the tube 24 of the watch case whereby to insure the watertightness of the crown.

The fifth embodiment of the invention illustrated in Fig. 5 distinguishes over the preceding ones in that the resiliency of the sealing ring 16c no longer is due to countersunk grooves or slots 21, but to a peripheral recess 29. The conical surface 27a of the closing ring 17b bears on a corresponding surface on the sealing ring 16c which latter in turn bears by means of a conical surface on a corresponding surface on the tightening ring 25a in precisely the same manner as described above with reference to Fig. 3. A curved disc 18a forces axially the various rings against one another, in the interior of the cavity 11 in the crown. Manifestly, the forces acting on the two conical surfaces of the sealing ring 16c tend to tighten its grip on the tube of the case in the same manner as with the preceding embodiments of the invention.

The sixth embodiment differs from the fifth only in that the axial pressure is exerted by the closing ring 17c itself instead of a curved disc acting as spring. All that is necessary to obtain this effect is to provide the closing ring split, in the manner described with reference to Fig. 4. In order to reduce any friction which might occur between the ring 17c and the bottom of the cavity 11 of the crown, a recess 30 is provided in the upper portion of the ring 17c.

In the seventh embodiment of the invention shown in Fig. 8, a sealing ring 31 is retained in the interior of the cavity 11 by a fixing ring 32 set at 33 in the base of the crown and arranged so as to close almost completely the annular space constituted by the cavity 11 and disposed between the inner side walls of the crown and the barrel 12 when the crown is in place on the watch.

The ring 31 is perforated by a cylindrical opening bored out in a manner such that the ring grips the tube 24 with snug fit. The conditions of friction are such that on the one hand, the sealing ring remains stationary with the tube 24 upon any rotary displacement of the crown during winding or setting of the hands of the watch; on the other hand, they permit an axial displacement of the crown during passage of the crown from winding to setting position or vice versa.

This ring 31 has the shape of a body of rotation the meridian of which in the lower part 34 of the ring 31 is the arc of a circle the center of which is located substantially on the axis of the tube 24 when the crown is in its place. Besides, this center is in the vicinity of the base of pipe 12. This means that the part 34 of the ring 31 has a convex surface in the form of a spherical zone.

A curved disc 18 provided between the bottom of the cavity 11 and the ring 31 forces axially this ring 31 toward the exterior of the crown and causes its part 34 to abut against a tightening ring 35 which has a surface portion 36 which is concave and likewise in the form of a spherical zone. The sphere defined by the zone 36 has substantially the same radius as the sphere defined by the zone 34 and the centers of the two spheres coincide substantially. The ring 35 is supported in a recess 37 provided in the fixing ring 32 in order to avoid too great an increase in the overall height of the crown.

Inasmuch as the rings 31 and 35 are in contact with one another along a spherical surface and are constantly forced against the ring 32 by means of the spring member 18, they constitute a tight closure for the crown.

Dependent on the kind of material these various elements are made of it, it may be advisable to interpose as shown in Fig. 8, a first washer 38 between the spring member 18 and the ring 31, and a second washer 39 between the spring member 18 and the bottom of the cavity 11.

These two washers which preferably are made of tempered steel, are designed to prevent the spring member from two quickly wearing on the ring 31 or the bottom of the cavity 11.

The spherical surfaces 34 and 36 are designed to result in a tight closure of the crown not only if the axis of the crown coincides precisely with that of the tube 24, but also in case these two axes form a slight angle between one another.

Finally, even if the pipe 12, for example, is not precisely coaxial with the crown, the tightening ring 35 will compensate for this slight offset by displacing itself laterally in the recess 37.

During a rotary displacement of the crown in one or the other direction, the rings 31 and 35 remain stationary with the tube and friction occurs along the plane surfaces in contact with one another, delimiting the ring 35 and the ring 32. At the other extremity of the ring 31, friction may occur in several places, for example between the washer 38 and the ring 31 or else between the spring member 18 and one or the other of the washers 38 and 39, or between the washer 39 and the bottom of the cavity 11, dependent on the manner in which these various surfaces are machined.

In no case rotary friction occurs on a cylindrical surface the axis of which coincides with the axis of the crown. In consequence, any wear due to friction is automatically compensated by the pressure of spring 18 which always insures the tight closure of the crown by axially compressing or forcing against one another the elements which are responsible for maintaining the watertightness.

The only difference between the foregoing seventh, and the eighth embodiment of the invention shown in Fig. 9, consists in that in the latter, the set ring 40 itself constitutes the tightening ring. For this purpose, it has a surface 41 in the form of a spherical zone, corresponding to the surface 36 of Fig. 8.

The tight joint is assured with this crown by the contact between the ring 31 and the ring 40 which corresponds to the manner of contact described with reference to Fig. 8. In the instant case, however, friction occurs between the two spherical surfaces 34 and 41. The resulting wear on these surfaces is compensated by the pressure of spring member 18 which constantly forces the ring 31 against the ring 40.

As shown in Fig. 9, a sole washer is provided between the spring member 18 and the ring 31.

In the embodiment of the invention shown in Fig. 10, the sealing ring 42 comprises two surface portions 43 and 44 in the shape of spherical zones. The first of these zones, 43, cooperates in the manner already described with reference to Fig. 9, with the surface 41 of the set ring 40 forming the tightening member.

The second of these portions, 44, the center of which is located substantially on the axis of the tube, in vicinity of the extremity of pipe 12, cooperates with a surface portion 45 which, provided on a closing ring 46, is concave, likewise in the shape of a spherical zone, and has the same dimension and arrangement as the surface 44. The spring member 18 abutting directly against the bottom of the cavity 11, exerts avial pressure on said closing ring 46 and through the same on the sealing ring 42 which assures the watertightness of the crown in a manner similar to that described with reference to Fig. 9.

In the last three embodiments of the invention, the surface portions in the form of spherical zones, in particular the convex portions, were zones defined by two planes situated on the same side of the diametrical plane of the sphere which is parallel to them.

In the tenth embodiment of the invention shown in Fig. 11, the convex spherical zone of the sealing ring is defined by two planes situated on either side of the diametrical plane of the sphere which is parallel to them.

The sealing ring 47 comprising this surface portion 48 could be made, for example, from a ball which is simply perforated by a diametrical cylindrical bore.

Apart from the aforesaid modification of the sealing ring, the watch crown according to Fig. 11 corresponds to that of Fig. 10 and functions in an identical manner.

In the last four embodiments of the invention, the surfaces provided to be in contact to assure the watertightness of the crown, are spherical and equal, but it is manifest that these surfaces also could be made spherical but with different diameters, and that one or both even could be replaced by some other kind of surface such as, for example, ellipsoidal surfaces. All that is necessary is that these surfaces fulfill the general condition for watertightness, namely that the two portions of these surfaces which are in contact with one another, always must be in contact at least in one point of any of their sections, and that the tangent at this point of contact on the meridian of the contact surface of one and the other of the two rings, cuts the axis of the crown.

The crowns described above have manifest advantages. During winding of the watch, any possibility of friction occurring on cylindrical surfaces is avoided. In this manner, wear of the elements, and particularly wear of the contact surfaces insuring watertightness is automatically compensated by the spring member exerting axial pressure on the elements disposed in the cavity 11 of the crown. The sealing ring is not exposed to friction on the tube except during displacement of the crown from winding to setting position. This friction results only in a negligible wear which, moreover, is compensated for, in the first six embodiments of the invention, by the resiliency of the sealing ring.

The various rings provided inside the crown are usually made of nickel silver, but may be made as well of a hard synthetic plastic material such as nylon, for example.

While I have disclosed the preferred embodiments of my invention and the preferred mode of carrying it into effect, it will be readily apparent to those skilled in the art that the invention as illustrated in the foregoing specification, is susceptible to numerous variations without departure from the spirit of the invention or sacrifice of the advantages thereof. Accordingly, the scope of the invention is to be understood as limited solely by the appended claims.

I claim:

1. In a winding and setting crown for watertight watches which is formed with a cavity and with a pipe projecting from the bottom of said cavity to secure the crown to a winding stem forming part of the watch and around a tube forming part of the watch case, the combination of a tightening ring at the opening of said cavity, said ring forming a tight joint with said crown and arranged to be moved by and with said crown on any rotary displacement thereof, a sealing ring between said tightening ring and the bottom of said cavity, said sealing ring being tapered at the end pointing toward the opening of said cavity and encompassing said watch case tube with snug fit to remain stationary with said tube during any rotary displacement of said crown, a spring means arranged to act axially on said crown and on said sealing ring and to normally keep said sealing ring and said tightening ring in contact with each other, said tightening ring being formed with a surface portion which corresponds to the tapered portion of said sealing ring, whereby both rings come in contact at least at one point of any section of said surface portions, whatever may be the position of the crown relative to said watch case tube, said tightening ring preventing the entrance of water into said cavity, said surface portions being so shaped that they remain in contact even if the direction of the axis of one of said rings should change slightly owing to rotary displacements of the crown relative to said tube, and abutting means formed by part of the interior wall of said crown surrounding said cavity and adapted to prevent said sealing ring from being moved against the action of said spring member a sufficient distance from said tightening ring that said spring is compressed beyond its limit of elasticity.

2. A crown for watertight watches according to claim 1, wherein the tightening ring is free in the crown.

3. A crown for watertight watches according to claim 1, wherein the said surface portions on the sealing and tightening rings are conical.

4. A crown for watertight watches according to claim 3, wherein the opening angle of the conical surface portion on the sealing ring is slightly smaller than that of the conical surface portion on the tightening ring.

5. A crown for watertight watches according to claim 3, wherein the conical portion on the sealing ring is truncated.

6. A crown for watertight watches according to claim 1, wherein the said surface portions on the sealing and tightening rings have a round section.

7. A crown for watertight watches according to claim 1, wherein the said surface portions on the sealing and tightening rings have substantially the form of spherical zones, the spheres defined by said zones having substantially equal radii and their centers coinciding substantially and being adapted to be disposed substantially on the axis of said tube.

8. A crown for watertight watches according to claim 7, wherein the spherical zone on the sealing ring is convex.

9. A crown for watertight watches according to claim 7, wherein the spherical zone on the sealing ring is defined by two planes disposed on the same side of the diametrical plane of the sphere parallel to them.

10. A crown for watertight watches according to claim 7, wherein the spherical zone on the sealing ring is defined by two planes disposed on different sides of the diametrical plane of the sphere parallel to them.

11. A crown for watertight watches according to claim 7, wherein the spherical zone on the tightening ring is concave.

12. A crown for watertight watches according to claim 7, wherein the centers of the two spheres defined by the spherical zones on the sealing and tightening rings coincide substantially in a point disposed in proximity to the base of said pipe.

13. A crown for watertight watches according to claim 1, comprising at least one radial incision in the sealing ring whereby to insure its snug fit on the said tube.

14. A crown for watertight watches according to claim 1, comprising a circumferential recess on said sealing ring whereby to insure its snug fit on the said tube.

15. A crown for watertight watches according to claim 1, comprising a ring fixed to the crown at the opening of its cavity and adapted to retain said sealing and tightening rings in said cavity.

16. A crown for watertight watches according to claim 1, wherein the tightening ring is fixed to the crown.

17. A crown for watertight watches according to claim 15, wherein the retaining ring is set in the crown.

18. A crown for watertight watches according to claim 15, wherein the tightening ring comes in contact with the retaining ring by way of a plane surface perpendicular to the axis of the crown.

19. A crown for watertight watches according to claim 1, comprising a closing ring interposed between said spring member and said sealing ring.

20. A crown for watertight watches according to claim 19, wherein the closing ring abuts against the sealing ring, with a plane surface.

21. A crown for watertight watches according to claim 19, wherein the closing ring abuts with a concave surface portion having the form of a spherical zone, against a surface portion having the form of a spherical zone on the sealing ring.

22. A crown for watertight watches according to claim 21, wherein the spheres defined by the spherical zones on the closing and sealing rings, have substantially equal radii, and the centers of said spheres are adapted to coincide substantially on the axis of said tube and in proximity to the extremity of said screw-threaded pipe.

23. A crown for watertight watches according to claim 1, wherein said spring member is a thin curved perforated disc interposed between the bottom of the cavity and the sealing ring.

24. A crown for watertight watches according to claim 1, wherein said spring member is a split ring.

25. A crown for watertight watches according to claim 24, comprising a supporting ring interposed between said split ring and the bottom of the cavity, the supporting ring and the split ring being in mutual contact along two conical surfaces.

26. A crown for watertight watches according to claim 24, wherein said split ring and said sealing ring both have conical surfaces whereby to abut against each other.

References Cited in the file of this patent

UNITED STATES PATENTS

| | | |
|---|---|---|
| 2,202,114 | Morf | May 28, 1940 |
| 2,405,087 | Boninchi | July 30, 1946 |
| 2,465,571 | Boninchi | Mar. 29, 1949 |

FOREIGN PATENTS

| | | |
|---|---|---|
| 160,801 | Switzerland | June 1, 1933 |
| 434,651 | Great Britain | Sept. 5, 1935 |
| 207,377 | Switzerland | Jan. 16, 1940 |
| 234,618 | Switzerland | Feb. 16, 1945 |
| 239,569 | Switzerland | Feb. 1, 1946 |
| 245,133 | Switzerland | June 16, 1947 |
| 250,115 | Switzerland | May 18, 1948 |
| 272,324 | Switzerland | Mar. 1, 1951 |
| 274,300 | Switzerland | June 16, 1951 |